(12) United States Patent
Masoud et al.

(10) Patent No.: US 10,289,018 B2
(45) Date of Patent: May 14, 2019

(54) ELECTROSTATIC INK COMPOSITION

(71) Applicant: HP Indigo B.V., Amstelveen (NL)

(72) Inventors: Emad Masoud, Nes Ziona (IL);
Regina Guslitzer, Nes Ziona (IL);
Anna Hen, Nes Ziona (IL); Eyal Shelef, Tel-Aviv (IL)

(73) Assignee: HP Indigo B.V., Amstelveen (NL)

( * ) Notice: Subject to any disclaimer, the term of this patent is extended or adjusted under 35 U.S.C. 154(b) by 0 days.

(21) Appl. No.: 15/770,113

(22) PCT Filed: Dec. 11, 2015

(86) PCT No.: PCT/EP2015/079368
§ 371 (c)(1),
(2) Date: Apr. 20, 2018

(87) PCT Pub. No.: WO2017/097369
PCT Pub. Date: Jun. 15, 2017

(65) Prior Publication Data
US 2018/0314178 A1    Nov. 1, 2018

(51) Int. Cl.
*G03G 9/12* (2006.01)
*C09D 11/03* (2014.01)
*C09D 11/037* (2014.01)
*G03G 9/135* (2006.01)
*C09D 11/107* (2014.01)
*C09D 11/52* (2014.01)
*G03G 9/125* (2006.01)
*G03G 9/13* (2006.01)
*G03G 15/10* (2006.01)

(52) U.S. Cl.
CPC ............. *G03G 9/122* (2013.01); *C09D 11/03* (2013.01); *C09D 11/037* (2013.01); *C09D 11/107* (2013.01); *C09D 11/52* (2013.01); *G03G 9/12* (2013.01); *G03G 9/125* (2013.01); *G03G 9/131* (2013.01); *G03G 9/135* (2013.01); *G03G 15/10* (2013.01)

(58) Field of Classification Search
CPC .................................. G03G 9/12; C09D 11/03
USPC ........................................................ 430/114
See application file for complete search history.

(56) References Cited

U.S. PATENT DOCUMENTS

| | | |
|---|---|---|
| 4,668,570 A | 5/1987 | Esselborn et al. |
| 6,596,447 B2 | 7/2003 | Camp et al. |
| 6,899,757 B2 | 5/2005 | Chang et al. |
| 8,039,183 B2 | 10/2011 | Veregin et al. |

(Continued)

FOREIGN PATENT DOCUMENTS

| | | | | |
|---|---|---|---|---|
| GB | 2 337 206 | * | 11/1999 | ............. A63B 43/00 |
| JP | 2005171024 | | 6/2005 | |

(Continued)

OTHER PUBLICATIONS

Iridesium 3325 Material Safety Data Sheet, Feb. 15, 2014 (Year: 2014).*

(Continued)

*Primary Examiner* — Mark A Chapman
(74) *Attorney, Agent, or Firm* — HP Inc. Patent Department

(57) ABSTRACT

Herein is described a liquid electrostatic ink composition comprising a pigment comprising mica coated with titanium dioxide and an additional metal oxide.

15 Claims, 1 Drawing Sheet

(56) References Cited

U.S. PATENT DOCUMENTS

| | | |
|---|---|---|
| 8,500,901 B2 | 8/2013 | Rueger et al. |
| 8,585,818 B1 | 11/2013 | Jones |
| 2010/0239871 A1 | 9/2010 | Scheffer et al. |
| 2013/0288175 A1 | 10/2013 | Chun et al. |
| 2015/0323879 A1* | 11/2015 | Kabalnov ............ C09D 11/037 428/207 |

FOREIGN PATENT DOCUMENTS

| | | |
|---|---|---|
| WO | WO-2014/120119 | 8/2014 |
| WO | WO-2015065469 | 5/2015 |

OTHER PUBLICATIONS

International Search Report and Written Opinion for International Application No. PCT/EP2015/079368 dated Aug. 11, 2016, 10 pages.

\* cited by examiner

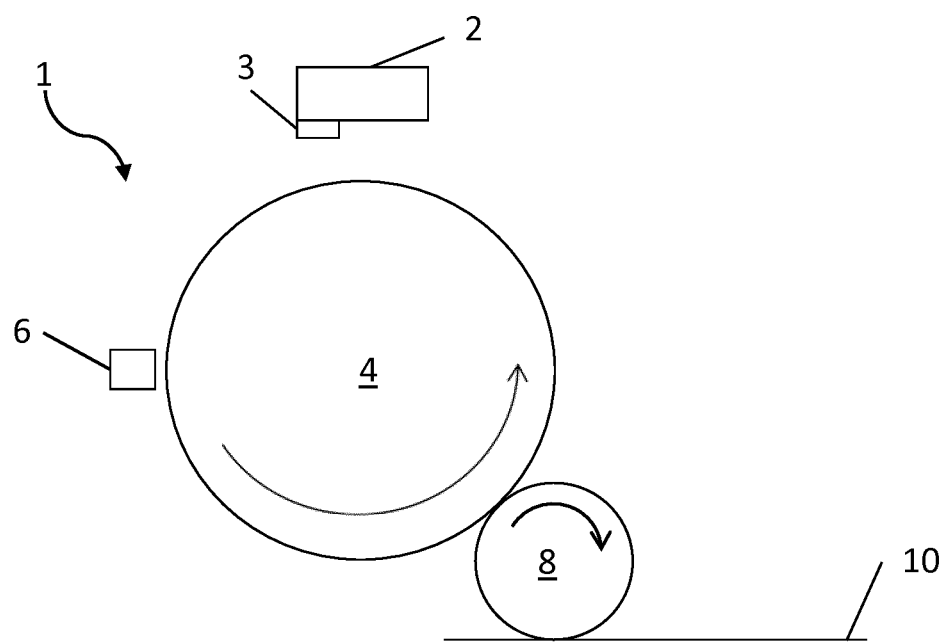

ELECTROSTATIC INK COMPOSITION

BACKGROUND

Electrophotographic printing processes, sometimes termed electrostatic printing processes, generally involve creating an image on a photoconductive surface, applying an ink having charged particles to the photoconductive surface, such that they selectively bind to the image, and then transferring the charged particles in the form of the image to a print substrate.

The photoconductive surface may be on a cylinder and is often termed a photo imaging plate (PIP). The photoconductive surface is selectively charged with a latent electrostatic image having image and background areas with different potentials. For example, an electrostatic ink composition including charged toner particles in a liquid carrier can be brought into contact with the selectively charged photoconductive surface. The charged toner particles adhere to the image areas of the latent image while the background areas remain clean. The image is then transferred to a print substrate (e.g. paper) directly or, by being first transferred to an intermediate transfer member, which can be a soft swelling blanket, which is often heated to fuse the solid image and evaporate the liquid carrier, and then to the print substrate.

BRIEF DESCRIPTION OF THE FIGURE

FIG. 1 is a schematic illustration of an example of a Liquid Electro Photographic (LEP) printing apparatus for printing an electrostatic ink composition.

DETAILED DESCRIPTION

Before the compositions, methods and related aspects of the disclosure are disclosed and described, it is to be understood that this disclosure is not restricted to the particular process features and materials disclosed herein because such process features and materials may vary somewhat. It is also to be understood that the terminology used herein is used for the purpose of describing particular examples. The terms are not intended to be limiting because the scope is intended to be limited by the appended claims and equivalents thereof.

It is noted that, as used in this specification and the appended claims, the singular forms "a," "an," and "the" include plural referents unless the context clearly dictates otherwise.

As used herein, "liquid carrier", "liquid carrier," "carrier," or "carrier vehicle" refers to the fluid in which the polymer resin, pigment, charge directors and/or other additives can be dispersed to form a liquid electrostatic ink or electrophotographic ink. Liquid carriers can include a mixture of a variety of different agents, such as surfactants, co-solvents, viscosity modifiers, and/or other possible ingredients.

As used herein, "electrostatic ink composition" generally refers to an ink composition, which may be in liquid form, generally suitable for use in an electrostatic printing process, sometimes termed an electrophotographic printing process. The electrostatic ink composition may include chargeable particles of the resin and the pigment dispersed in a liquid carrier, which may be as described herein.

As used herein, "co-polymer" refers to a polymer that is polymerized from at least two monomers.

As used herein, "melt flow rate" generally refers to the extrusion rate of a resin through an orifice of defined dimensions at a specified temperature and load, usually reported as temperature/load, e.g. 190° C./2.16 kg. Flow rates can be used to differentiate grades or provide a measure of degradation of a material as a result of molding. In the present disclosure, "melt flow rate" is measured per ASTM D1238-04c Standard Test Method for Melt Flow Rates of Thermoplastics by Extrusion Plastometer. If a melt flow rate of a particular polymer is specified, unless otherwise stated, it is the melt flow rate for that polymer alone, in the absence of any of the other components of the electrostatic composition.

As used herein, "acidity," "acid number," or "acid value" refers to the mass of potassium hydroxide (KOH) in milligrams that neutralizes one gram of a substance. The acidity of a polymer can be measured according to standard techniques, for example as described in ASTM D1386. If the acidity of a particular polymer is specified, unless otherwise stated, it is the acidity for that polymer alone, in the absence of any of the other components of the liquid toner composition.

As used herein, "melt viscosity" generally refers to the ratio of shear stress to shear rate at a given shear stress or shear rate. Testing is generally performed using a capillary rheometer. A plastic charge is heated in the rheometer barrel and is forced through a die with a plunger. The plunger is pushed either by a constant force or at constant rate depending on the equipment. Measurements are taken once the system has reached steady-state operation. One method used is measuring Brookfield viscosity @ 140° C., units are mPa-s or cPoise. In some examples, the melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate. If the melt viscosity of a particular polymer is specified, unless otherwise stated, it is the melt viscosity for that polymer alone, in the absence of any of the other components of the electrostatic composition.

A certain monomer may be described herein as constituting a certain weight percentage of a polymer. This indicates that the repeating units formed from the said monomer in the polymer constitute said weight percentage of the polymer.

If a standard test is mentioned herein, unless otherwise stated, the version of the test to be referred to is the most recent at the time of filing this patent application.

As used herein, "electrostatic(ally) printing" or "electrophotographic(ally) printing" generally refers to the process that provides an image that is transferred from a photo imaging substrate or plate either directly or indirectly via an intermediate transfer member to a print substrate, e.g. a paper substrate. As such, the image is not substantially absorbed into the photo imaging substrate or plate on which it is applied. Additionally, "electrophotographic printers" or "electrostatic printers" generally refer to those printers capable of performing electrophotographic printing or electrostatic printing, as described above. "Liquid electrophotographic printing" is a specific type of electrophotographic printing where a liquid ink is employed in the electrophotographic process rather than a powder toner. An electrostatic printing process may involve subjecting the electrophotographic ink composition to an electric field, e.g. an electric field having a field strength of 1000 V/cm or more, in some examples 1000 V/mm or more.

As used herein, the term "about" is used to provide flexibility to a numerical range endpoint by providing that a given value may be a little above or a little below the endpoint. The degree of flexibility of this term can be dictated by the particular variable.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not just the numerical values explicitly recited as the end points of the range, but also to include all the individual numerical values or sub-ranges encompassed within that range as if each numerical value and sub-range is explicitly recited. As an illustration, a numerical range of "about 1 wt % to about 5 wt %" should be interpreted to include not just the explicitly recited values of about 1 wt % to about 5 wt %, but also include individual values and subranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

As used herein, unless specified otherwise, wt % values are to be taken as referring to a weight-for-weight (w/w) percentage of solids in the ink composition, and not including the weight of any carrier fluid present.

Unless otherwise stated, any feature described herein can be combined with any aspect or any other feature described herein.

In an aspect there is provided a liquid electrostatic ink composition. The liquid electrostatic ink composition may comprise:
 a pigment comprising mica coated with titanium dioxide and an additional metal oxide;
 a resin; and
 a carrier liquid.

In another aspect there is provided a method for producing an electrostatic ink composition. The method may comprise:
 providing a pigment comprising mica coated with titanium dioxide and an additional metal oxide; and
 combining the pigment, a resin and a carrier liquid to form an electrostatic ink composition.

In another aspect there is provided a method of electrostatic printing. The method may comprise:
 providing a liquid electrostatic ink composition comprising:
  a pigment comprising mica coated with titanium dioxide and an additional metal oxide;
  a resin; and
  a carrier liquid;
 contacting the liquid electrostatic ink composition with a latent electrostatic image on a surface to create a developed image; and
 transferring the developed image to a print substrate.

The present inventors have found that providing a liquid electrostatic ink composition comprising a pigment comprising mica coated with titanium dioxide and an additional metal oxide can be used to provide a gold liquid electrostatic ink composition. By providing such electrostatic ink compositions, the present inventors have found that gold liquid electrostatic ink compositions can be provided without using conductive metallic pigments.

Electrostatic Ink Composition

The liquid electrostatic ink composition may be a gold liquid electrostatic ink composition comprising a gold pigment. The liquid electrostatic ink composition may comprise a gold pigment comprising mica coated with titanium dioxide and an additional metal oxide.

Pigment

The electrostatic ink composition comprises a pigment comprising mica coated with titanium dioxide and an additional metal oxide. The additional metal oxide is a metal oxide other than titanium dioxide.

As used herein, the term 'mica' refers to a mica-based mineral, for example a silicate, e.g. an aluminosilicate, having a substantially flat morphology. The mica-based mineral may be synthetic mica or natural mica. In some examples, the mica is a natural mica, e.g. muscovite.

The mica may be provided as flakes having a length (the term 'length' is used to refer to the longest dimension of a flake) in the range of about 5 to 25 µm. In some examples, the flakes may have a thickness ranging from about 100 to about 1500 nm, in some examples about 100 to about 500 nm, in some examples from about 500 nm to about 1000 nm. The length of mica flakes in an electrostatic composition may be less than 25 µm, in some examples less than 15 µm, in some examples less than 10 µm, in some examples less than 5 µm. In some examples, the mica flakes may have a length in the range of about 2 to about 25 µm, in some example from about 2 to about 20 µm, in some examples these flakes being coated with titanium dioxide and an additional metal oxide.

In some examples, the pigment comprises at least about 20 wt. % mica, in some examples at least about 25 wt. % mica, in some examples at least about 28 wt. % mica. In some examples the pigment comprises up to about 60 wt. % mica, in some examples up to about 55 wt. % mica, in some examples up to about 50 wt. % mica, in some examples up to about 45 wt. % mica, in some examples up to about 40 wt. % mica, in some examples up to about 38 wt. % mica. In some examples, the pigment comprises 25 wt. % to 55 wt. % mica, in some examples 28 wt. % to 38 wt. % mica.

In some examples, the pigment comprises mica coated with titanium dioxide and an additional metal oxide, wherein the pigment comprises at least about 20 wt. % titanium dioxide, in some examples at least about 30 wt. % titanium dioxide, in some examples at least about 40 wt. % titanium dioxide, in some examples at least about 45 wt. % titanium dioxide, in some examples at least about 50 wt. % titanium dioxide, in some examples at least about 55 wt. % titanium dioxide. In some examples, the pigment comprises up to about 70 wt. % titanium dioxide, in some examples to about 65 wt. % titanium dioxide. In some examples the pigment comprises 20 wt. % to about 70 wt. % titanium dioxide, in some examples 55 wt % to 65 wt. % titanium dioxide.

In some examples, the pigment comprises mica coated with silicon oxide ($SiO_2$). In some examples, the mica is coated with silicon oxide, titanium dioxide and an additional metal oxide.

In some examples, the pigment comprises mica coated with a layer of silicon oxide on which is disposed a layer of titanium dioxide. The additional metal oxide may be disposed on the layer of titanium dioxide which may be disposed on the layer of silicon oxide disposed on the mica, e.g. on a mica flake.

In some examples, the additional metal oxide comprises iron oxide (e.g. iron (III) oxide). In some examples the additional metal oxide comprises iron oxide and tin dioxide. In some examples, the additional metal oxide comprises iron oxide and zirconium dioxide. In some examples, the additional metal oxide comprises iron oxide, tin dioxide and zirconium dioxide.

In some examples, the additional metal oxides comprises iron oxide in combination with tin dioxide and/or zirconium dioxide.

In some examples, the pigment comprises iron oxide (e.g. iron (III) oxide) as the additional metal oxide or one of the additional metal oxides. In some examples, the pigment comprises greater than about 5 wt. % iron oxide, in some examples greater than 8 wt. % iron oxide, in some examples about 9 wt. % iron oxide or greater, in some examples greater than 10 wt. % iron oxide, in some examples greater than 12 wt. % iron oxide. In some examples, the pigment comprises up to about 40 wt. % iron oxide, in some examples up to about 35 wt. % iron oxide, in some examples up to about 30 wt. % iron oxide, in some examples up to about 20 wt. % iron oxide, in some examples up to about 18 wt. % iron oxide, in some example up to about 16 wt. % iron oxide. In some examples the pigment comprises 8 wt. % to 40 wt. % iron oxide, in some examples 12 wt. % to 16 wt. % iron oxide.

In some examples the pigment comprises zirconium dioxide. In some examples, the pigment comprises up to about 5 wt. % zirconium dioxide, in some examples up to about 3 wt. % zirconium dioxide, in some examples up to about 2 wt. % zirconium dioxide.

In some examples the pigment comprises tin dioxide. In some examples the pigment comprises greater than about 0.01 wt. % tin dioxide, in some examples greater than about 0.05 wt. % tin dioxide, in some examples greater than about 0.1 wt. % tin dioxide, in some examples greater than about 0.5 wt. % tin dioxide. In some examples the pigment comprises up to about 5 wt. % tin dioxide, in some examples up to about 2 wt. % tin dioxide, in some examples up to about 1 wt. % tin dioxide.

In some examples the pigment comprises 20 to 55 wt. % mica, 20 to 70 wt. % titanium dioxide, and 5 to 40 wt. % iron oxide (e.g. iron (III) oxide). In some examples the pigment comprises 20 to 55 wt. % mica, 20 to 70 wt. % titanium dioxide, 15 to 40 wt. % iron oxide and tin dioxide in an amount less than 2 wt. %.

In some examples the pigment comprises or consists of 28 wt. % to 38 wt. % mica, 55 wt % to 65 wt. % titanium dioxide, 12 wt. % to 16 wt. % iron oxide (e.g. iron (III) oxide). In some examples the pigment comprises or consists of 28 wt. % to 38 wt. % mica, 55 wt % to 65 wt. % titanium dioxide, 12 wt. % to 16 wt. % iron oxide and tin dioxide in an amount less than 1 wt. %.

In some examples, the pigment comprises titanium dioxide and iron oxide (e.g. iron (III) oxide) in a ratio of from about 1:1 to about 10:1 by weight, in some examples from about 1.1:1 to about 10:1 by weight, in some examples from about 2:1 to about 10:1 by weight, in some examples from about 3:1 to about 8:1, in some examples about 3:1 to about 6:1, in some examples about 3.5:1 to about 5.5:1, in some examples from about 1.1:1 to about 5.5:1.

In some examples, the pigment comprises pigment particles comprising mica coated with titanium dioxide and an additional metal oxide. In some examples, the pigment comprises a mica core coated with titanium dioxide and an additional metal oxide. In some examples the pigment comprises pigment particles comprising a mica core coated with titanium dioxide and an additional metal oxide. In some examples the pigment comprises pigment particles comprising a mica core coated with silicon dioxide, titanium dioxide and an additional metal oxide.

In some examples, the pigment particles of the electrostatic ink composition have a length of less than about 25 µm, for example a length in the range of about 5 µm to about 25 µm, in some examples about 2 µm to about 25 µm, in some examples about 2 µm to about 20 µm.

The length of the pigment particles is used to refer to the longest dimension of the pigment particles.

Unless otherwise stated, the particle size (e.g. length) of the pigment particles and/or mica flakes is determined using laser diffraction on a Malvern Mastersizer 2000 according to the standard procedure as described in the operating manual.

In some examples, the pigment may be selected from Iriodin® 323 WNT, Iriodin® 303 WNT, Iriodin® 327 fine star gold, Iriodin® 302 WII (all available from Merck) and Iridesium 3325 (available from Jiang Su Pritty Pearlescent Pigments Co., Ltd)

Resin

The electrostatic ink composition includes a resin, which may be a thermoplastic resin. A thermoplastic polymer is sometimes referred to as a thermoplastic resin. The resin may coat the pigment. In some examples, the resin coats the pigment such that particles are formed having a core of pigment and an outer layer of resin thereon. The outer layer of resin may coat the pigment partially or completely.

In some examples, the electrostatic ink composition may comprise ink particles comprising a pigment and a resin.

The resin typically includes a polymer. In some examples, the polymer of the resin may be selected from ethylene acrylic acid copolymers; ethylene methacrylic acid copolymers; ethylene vinyl acetate copolymers; copolymers of ethylene (e.g. 80 wt % to 99.9 wt %), and alkyl (e.g. C1 to C5) ester of methacrylic or acrylic acid (e.g. 0.1 wt % to 20 wt %); copolymers of ethylene (e.g. 80 wt % to 99.9 wt %), acrylic or methacrylic acid (e.g. 0.1 wt % to 20.0 wt %) and alkyl (e.g. C1 to C5) ester of methacrylic or acrylic acid (e.g. 0.1 wt % to 20 wt %); polyethylene; polystyrene; isotactic polypropylene (crystalline); ethylene ethyl acrylate; polyesters; polyvinyl toluene; polyamides; styrene/butadiene copolymers; epoxy resins; acrylic resins (e.g. copolymer of acrylic or methacrylic acid and at least one alkyl ester of acrylic or methacrylic acid wherein alkyl is, in some examples, from 1 to about 20 carbon atoms, such as methyl methacrylate (e.g. 50 wt % to 90 wt %)/methacrylic acid (e.g. 0 wt % to 20 wt %)/ethylhexylacrylate (e.g. 10 wt % to 50 wt %)); ethylene-acrylate terpolymers: ethylene-acrylic esters-maleic anhydride (MAH) or glycidyl methacrylate (GMA) terpolymers; ethylene-acrylic acid ionomers and combinations thereof.

In some examples, the polymer is a copolymer of an alkylene monomer and a monomer having an acid side group. In some examples the alkylene monomer is an ethylene or a propylene monomer. In some examples, the monomer having an acid side group is an acrylic acid monomer or a methacrylic acid monomer. In some examples, the electrostatic ink composition comprises a polymer resin comprising a copolymer of an alkylene monomer and a monomer selected from acrylic acid and methacrylic acid.

The resin may comprise a polymer having acidic side groups. The polymer having acidic side groups may have an acidity of 50 mg KOH/g or more, in some examples an acidity of 60 mg KOH/g or more, in some examples an acidity of 70 mg KOH/g or more, in some examples an acidity of 80 mg KOH/g or more, in some examples an acidity of 90 mg KOH/g or more, in some examples an acidity of 100 mg KOH/g or more, in some examples an acidity of 105 mg KOH/g or more, in some examples 110 mg KOH/g or more, in some examples 115 mg KOH/g or more. The polymer having acidic side groups may have an acidity of 200 mg KOH/g or less, in some examples 190 mg or less, in some examples 180 mg or less, in some examples 130 mg KOH/g or less, in some examples 120 mg KOH/g or less. Acidity of a polymer, as measured in mg KOH/g can be measured using standard procedures, for example using the procedure described in ASTM D1386.

The resin may comprise a polymer, in some examples a polymer having acidic side groups, that has a melt flow rate of less than about 60 g/10 minutes, in some examples about 50 g/10 minutes or less, in some examples about 40 g/10 minutes or less, in some examples 30 g/10 minutes or less, in some examples 20 g/10 minutes or less, in some examples 10 g/10 minutes or less. In some examples, all polymers having acidic side groups and/or ester groups in the particles each individually have a melt flow rate of less than 90 g/10 minutes, 80 g/10 minutes or less, in some examples 80 g/10 minutes or less, in some examples 70 g/10 minutes or less, in some examples 70 g/10 minutes or less, in some examples 60 g/10 minutes or less.

The polymer having acidic side groups can have a melt flow rate of about 10 g/10 minutes to about 120 g/10 minutes, in some examples about 10 g/10 minutes to about 70 g/10 minutes, in some examples about 10 g/10 minutes to 40 g/10 minutes, in some examples 20 g/10 minutes to 30 g/10 minutes. The polymer having acidic side groups can have a melt flow rate of in some examples about 50 g/10 minutes to about 120 g/10 minutes, in some examples 60 g/10 minutes to about 100 g/10 minutes.

In some examples, the polymer having acid side groups has a melt flow rate of greater than about 120 g/10 minutes, in some examples greater than about 200 g/10 minutes, in some examples greater than about 300 g/10 minutes, in some examples greater than about 400 g/10 minutes. In some examples, the polymer having acid side groups has a melt flow rate of about 450 g/10 minutes.

In some examples, the polymer having acid side groups has a melt flow rate of less than about 500 g/10 minutes.

In some examples, the polymer having acid side groups has a melt flow rate in the range of about 150 g/10 minutes to about 600 g/10 minutes. In some examples, the polymer having acid side groups has a melt flow rate in the range of about 200 g/10 minutes to about 500 g/10 minutes.

In some examples, the polymer having acid side groups constitutes at least 50 wt. % of the resin, in some examples at least 60 wt. % in some examples at least 80 wt. %, in some examples at least 90 wt. %. In some examples, the polymer having acid side groups has a melt flow rate of greater than about 200 g/10 minutes, in some examples a melt flow rate of greater than about 200 g/10 minutes and up to about 500 g/10 minutes, and constitutes at least 50 wt. % of the resin, in some examples at least 60 wt. % in some examples at least 80 wt. %, in some examples at least 90 wt. %.

The melt flow rate can be measured using standard procedures, for example as described in ASTM D1238.

The acidic side groups may be in free acid form or may be in the form of an anion and associated with one or more counterions, generally metal counterions, e.g. a metal selected from the alkali metals, such as lithium, sodium and potassium, alkali earth metals, such as magnesium or calcium, and transition metals, such as zinc. The polymer having acidic sides groups can be selected from resins such as copolymers of ethylene and an ethylenically unsaturated acid of either acrylic acid or methacrylic acid; and ionomers thereof, such as methacrylic acid and ethylene-acrylic or methacrylic acid copolymers which are at least partially neutralized with metal ions (e.g. Zn, Na, Li) such as SUR-LYN® ionomers. The polymer comprising acidic side groups can be a copolymer of ethylene and an ethylenically unsaturated acid of either acrylic or methacrylic acid, where the ethylenically unsaturated acid of either acrylic or methacrylic acid constitute from 5 wt % to about 25 wt % of the copolymer, in some examples from 10 wt % to about 20 wt % of the copolymer.

The resin may comprise two different polymers having acidic side groups. The two polymers having acidic side groups may have different acidities, which may fall within the ranges mentioned above. The resin may comprise a first polymer having acidic side groups that has an acidity of from 50 mg KOH/g to 110 mg KOH/g and a second polymer having acidic side groups that has an acidity of 110 mg KOH/g to 130 mg KOH/g.

The resin may comprise two different polymers having acidic side groups: a first polymer having acidic side groups that has a melt flow rate of about 10 g/10 minutes to about 50 g/10 minutes and an acidity of from 50 mg KOH/g to 110 mg KOH/g, and a second polymer having acidic side groups that has a melt flow rate of about 50 g/10 minutes to about 120 g/10 minutes and an acidity of 110 mg KOH/g to 130 mg KOH/g. The first and second polymers may be absent of ester groups.

The resin may comprise two different polymers having acidic side groups: a first polymer that is a copolymer of ethylene (e.g. 92 to 85 wt %, in some examples about 89 wt %) and acrylic or methacrylic acid (e.g. 8 to 15 wt %, in some examples about 11 wt %) having a melt flow rate of 80 to 110 g/10 minutes and a second polymer that is a co-polymer of ethylene (e.g. about 80 to 92 wt %, in some examples about 85 wt %) and acrylic acid (e.g. about 18 to 12 wt %, in some examples about 15 wt %), having a melt viscosity lower than that of the first polymer, the second polymer for example having a melt viscosity of 15000 poise or less, in some examples a melt viscosity of 10000 poise or less, in some examples 1000 poise or less, in some examples 100 poise or less, in some examples 50 poise or less, in some examples 10 poise or less. Melt viscosity can be measured using standard techniques. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

In any of the resins mentioned above, the ratio of the first polymer having acidic side groups to the second polymer having acidic side groups can be from about 10:1 to about 2:1. In another example, the ratio can be from about 6:1 to about 3:1, in some examples about 4:1.

The resin may comprise a polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; said polymer may be a polymer having acidic side groups as described herein. The resin may comprise a first polymer having a melt viscosity of 15000 poise or more, in some examples 20000 poise or more, in some examples 50000 poise or more, in some examples 70000 poise or more; and in some examples, the resin may comprise a second polymer having a melt viscosity less than the first polymer, in some examples a melt viscosity of 15000 poise or less, in some examples a melt viscosity of 10000 poise or less, in some examples 1000 poise or less, in some examples 100 poise or less, in some examples 50 poise or less, in some examples 10 poise or less. The resin may comprise a first polymer having a melt viscosity of more than 60000 poise, in some examples from 60000 poise to 100000 poise, in some examples from 65000 poise to 85000 poise; a second polymer having a melt viscosity of from 15000 poise to 40000 poise, in some examples 20000 poise to 30000 poise, and a third polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; an example of the first polymer is Nucrel 960 (from DuPont), and example of the second polymer is Nucrel 699 (from DuPont), and an example of the third polymer is AC-5120 (from Honeywell). The first, second and third polymers may be polymers having acidic side groups as described herein. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

If the resin comprises a single type of resin polymer, the resin polymer (excluding any other components of the electrostatic ink composition) may have a melt viscosity of 6000 poise or more, in some examples a melt viscosity of 8000 poise or more, in some examples a melt viscosity of 10000 poise or more, in some examples a melt viscosity of 12000 poise or more. If the resin comprises a plurality of polymers all the polymers of the resin may together form a mixture (excluding any other components of the electrostatic ink composition) that has a melt viscosity of 6000 poise or more, in some examples a melt viscosity of 8000 poise or more, in some examples a melt viscosity of 10000 poise or more, in some examples a melt viscosity of 12000 poise or more. Melt viscosity can be measured using standard techniques. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

The resin may comprise two different polymers having acidic side groups that are selected from copolymers of ethylene and an ethylenically unsaturated acid of either methacrylic acid or acrylic acid; and ionomers thereof, such as methacrylic acid and ethylene-acrylic or methacrylic acid copolymers which are at least partially neutralized with metal ions (e.g. Zn, Na, Li) such as SURLYN® ionomers. The resin may comprise (i) a first polymer that is a copolymer of ethylene and an ethylenically unsaturated acid of either acrylic acid and methacrylic acid, wherein the ethylenically unsaturated acid of either acrylic or methacrylic acid constitutes from 8 wt % to about 16 wt % of the copolymer, in some examples 10 wt % to 16 wt % of the copolymer; and (ii) a second polymer that is a copolymer of ethylene and an ethylenically unsaturated acid of either acrylic acid and methacrylic acid, wherein the ethylenically unsaturated acid of either acrylic or methacrylic acid constitutes from 12 wt % to about 30 wt % of the copolymer, in some examples from 14 wt % to about 20 wt % of the copolymer, in some examples from 16 wt % to about 20 wt % of the copolymer in some examples from 17 wt % to 19 wt % of the copolymer.

In some examples, the resin essentially consists of a copolymer of ethylene and methacrylic acid. In some examples the methacrylic acid of the copolymer of ethylene and methacrylic acid constitutes about 8 wt % to about 12 wt % of the copolymer, in some examples about 9 wt % to about 11 wt % of the copolymer, in some examples about 10 wt. % of the copolymer.

In an example, the resin constitutes about 5 to 90%, in some examples about 5 to 80%, by weight of the solids of the electrostatic ink composition. In another example, the resin constitutes about 10 to 60% by weight of the solids of the electrostatic ink composition. In another example, the resin constitutes about 15 to 40% by weight of the solids of the electrostatic ink composition. In another example, the resin constitutes about 60 to 95% by weight, in some examples from 80 to 90% by weight, of the solids of the electrostatic ink composition.

The resin may comprise a polymer having acidic side groups, as described above (which may be free of ester side groups), and a polymer having ester side groups. The polymer having ester side groups is, in some examples, a thermoplastic polymer. The polymer having ester side groups may further comprise acidic side groups. The polymer having ester side groups may be a co-polymer of a monomer having ester side groups and a monomer having acidic side groups. The polymer may be a co-polymer of a monomer having ester side groups, a monomer having acidic side groups, and a monomer absent of any acidic and ester side groups. The monomer having ester side groups may be a monomer selected from esterified acrylic acid or esterified methacrylic acid. The monomer having acidic side groups may be a monomer selected from acrylic or methacrylic acid. The monomer absent of any acidic and ester side groups may be an alkylene monomer, including, for example, ethylene or propylene. The esterified acrylic acid or esterified methacrylic acid may, respectively, be an alkyl ester of acrylic acid or an alkyl ester of methacrylic acid. The alkyl group in the alkyl ester of acrylic or methacrylic acid may be an alkyl group having 1 to 30 carbons, in some examples 1 to 20 carbons, in some examples 1 to 10 carbons; in some examples selected from methyl, ethyl, iso-propyl, n-propyl, t-butyl, iso-butyl, n-butyl and pentyl.

The polymer having ester side groups may be a copolymer of a first monomer having ester side groups, a second monomer having acidic side groups and a third monomer which is an alkylene monomer absent of any acidic and ester side groups. The polymer having ester side groups may be a co-polymer of (i) a first monomer having ester side groups selected from esterified acrylic acid or esterified methacrylic acid, in some examples an alkyl ester of acrylic or methacrylic acid, (ii) a second monomer having acidic side groups selected from acrylic or methacrylic acid and (iii) a third monomer which is an alkylene monomer selected from ethylene and propylene. The first monomer may constitute 1 to 50% by weight of the co-polymer, in some examples 5 to 40% by weight, in some examples 5 to 20% by weight of the copolymer, in some examples 5 to 15% by weight of the copolymer. The second monomer may constitute 1 to 50% by weight of the co-polymer, in some examples 5 to 40% by weight of the co-polymer, in some examples 5 to 20% by weight of the co-polymer, in some examples 5 to 15% by weight of the copolymer. In an example, the first monomer constitutes 5 to 40% by weight of the co-polymer, the second monomer constitutes 5 to 40% by weight of the co-polymer, and with the third monomer constituting the remaining weight of the copolymer. In an example, the first monomer constitutes 5 to 15% by weight of the co-polymer, the second monomer constitutes 5 to 15% by weight of the co-polymer, with the third monomer constituting the remaining weight of the copolymer. In an example, the first monomer constitutes 8 to 12% by weight of the co-polymer, the second monomer constitutes 8 to 12% by weight of the co-polymer, with the third monomer constituting the remaining weight of the copolymer. In an example, the first monomer constitutes about 10% by weight of the co-polymer, the second monomer constitutes about 10% by weight of the co-polymer, and with the third monomer constituting the remaining weight of the copolymer. The polymer having ester side groups may be selected from the Bynel® class of monomer, including Bynel 2022 and Bynel 2002, which are available from DuPont®.

The polymer having ester side groups may constitute 1% or more by weight of the total amount of the resin polymers in the resin, e.g. the total amount of the polymer or polymers having acidic side groups and polymer having ester side groups. The polymer having ester side groups may constitute 5% or more by weight of the total amount of the resin polymers in the resin, in some examples 8% or more by weight of the total amount of the resin polymers in the resin, in some examples 10% or more by weight of the total amount of the resin polymers in the resin, in some examples 15% or more by weight of the total amount of the resin polymers in the resin, in some examples 20% or more by weight of the total amount of the resin polymers in the resin, in some examples 25% or more by weight of the total amount of the resin polymers in the resin, in some examples 30% or more by weight of the total amount of the resin polymers in the resin, in some examples 35% or more by weight of the total amount of the resin polymers in the resin. The polymer having ester side groups may constitute from 5% to 50% by weight of the total amount of the resin polymers in the resin, in some examples 10% to 40% by weight of the total amount of the resin polymers in the resin, in some examples 15% to 30% by weight of the total amount of the polymers in the resin.

The polymer having ester side groups may have an acidity of 50 mg KOH/g or more, in some examples an acidity of 60 mg KOH/g or more, in some examples an acidity of 70 mg KOH/g or more, in some examples an acidity of 80 mg KOH/g or more. The polymer having ester side groups may have an acidity of 100 mg KOH/g or less, in some examples 90 mg KOH/g or less. The polymer having ester side groups may have an acidity of 60 mg KOH/g to 90 mg KOH/g, in some examples 70 mg KOH/g to 80 mg KOH/g.

The polymer having ester side groups may have a melt flow rate of about 10 g/10 minutes to about 120 g/10 minutes, in some examples about 10 g/10 minutes to about 50 g/10 minutes, in some examples about 20 g/10 minutes to about 40 g/10 minutes, in some examples about 25 g/10 minutes to about 35 g/10 minutes.

In an example, the polymer or polymers of the resin can be selected from the Nucrel family of toners (e.g. Nucrel 403™, Nucrel 407™, Nucrel 609HS™, Nucrel 908HS™, Nucrel 1202HC™, Nucrel 30707™, Nucrel 1214™, Nucrel 903™, Nucrel 3990™, Nucrel 910™, Nucrel 925™, Nucrel 699™, Nucrel 599™, Nucrel 960™, Nucrel RX 76™, Nucrel 2806™Bynell 2002, Bynell 2014, and Bynell 2020 (sold by E. I. du PONT)), the Aclyn family of toners (e.g. Aaclyn 201, Aclyn 246, Aclyn 285, and Aclyn 295), and the Lotader family of toners (e.g. Lotader 2210, Lotader, 3430, and Lotader 8200 (sold by Arkema)).

In some examples, the pigment constitutes a certain wt %, e.g. from 1 wt %, to 60 wt % of the solids of the electrostatic ink composition, and the remaining wt % of the solids of the electrostatic ink composition is formed by the resin and, in some examples, any other additives that are present. The other additives may constitute 10 wt % or less of the solids of the electrostatic ink composition, in some examples 5 wt % or less of the solids of the electrostatic ink composition, in some examples 3 wt % or less of the solids of the electrostatic ink composition. In some examples, the resin may constitute 5% to 99% by weight of the solids in the electrostatic ink composition, in some examples 50% to 90% by weight of the solids of the electrostatic ink composition, in some examples 70% to 90% by weight of the solids of the electrostatic ink composition. The remaining wt % of the solids in the ink composition may be a pigment and, in some examples, any other additives that may be present.

Carrier Liquid

The electrostatic ink composition may include a liquid carrier. In some examples, the electrostatic ink composition comprises ink particles including the resin may be dispersed in the liquid carrier. The liquid carrier can include or be a hydrocarbon, silicone oil, vegetable oil, etc. The liquid carrier can include, for example, an insulating, non-polar, non-aqueous liquid that can be used as a medium for ink particles, i.e. the ink particles including the resin and, in some examples, a pigment. The liquid carrier can include compounds that have a resistivity in excess of about $10^9$ ohm·cm. The liquid carrier may have a dielectric constant below about 5, in some examples below about 3. The liquid carrier can include hydrocarbons. The hydrocarbon can include, for example, an aliphatic hydrocarbon, an isomerized aliphatic hydrocarbon, branched chain aliphatic hydrocarbons, aromatic hydrocarbons, and combinations thereof. Examples of the liquid carriers include, for example, aliphatic hydrocarbons, isoparaffinic compounds, paraffinic compounds, dearomatized hydrocarbon compounds, and the like. In particular, the liquid carriers can include, for example, Isopar-G™, Isopar-H™, Isopar-L™, Isopar-M™, Isopar-K™, Isopar-V™, Norpar 12™, Norpar 13™, Norpar 15™, Exxol D40™, Exxol D80™, Exxol D100™, Exxol D130™, and Exxol D140™(each sold by EXXON CORPORATION); Teclen N-16™, Teclen N-20™, Teclen N-22™Nisseki Naphthesol L™, Nisseki Naphthesol M™, Nisseki Naphthesol H™, #0 Solvent L™, #0 Solvent M™, #0 Solvent H™, Nisseki Isosol 300™, Nisseki Isosol 400™, AF-4™, AF-5™, AF-6™, and AF-7™, (each sold by NIPPON OIL CORPORATION); IP Solvent 1620™, and IP Solvent 2028™, (each sold by IDEMITSU PETROCHEMICAL CO., LTD.); Amsco OMS™, and Amsco 460™, (each sold by AMERICAN MINERAL SPIRITS CORP.); and Electron, Positron, New II, Purogen HF (100% synthetic terpenes) (sold by ECOLINK™)

The liquid carrier can constitute about 20% to 99.5% by weight of the electrostatic ink composition, in some examples 50% to 99.5% by weight of the electrostatic ink composition. The liquid carrier may constitute about 40 to 90% by weight of the electrostatic ink composition. The liquid carrier may constitute about 60% to 80% by weight of the electrostatic ink composition. The liquid carrier may constitute about 90% to 99.5% by weight of the electrostatic ink composition, in some examples 95% to 99% by weight of the electrostatic ink composition.

The electrostatic ink composition, when printed on a print substrate, may be substantially free from liquid carrier. In an electrostatic printing process and/or afterwards, the liquid carrier may be removed, e.g. by an electrophoresis processes during printing and/or evaporation, such that substantially just solids are transferred to the print substrate. Substantially free from liquid carrier may indicate that the ink printed on the print substrate contains less than 5 wt % liquid carrier, in some examples, less than 2 wt % liquid carrier, in some examples less than 1 wt % liquid carrier, in some examples less than 0.5 wt % liquid carrier. In some examples, the ink printed on the print substrate is free from liquid carrier.

Charge Director

In some examples, the electrostatic ink composition includes a charge director. The charge director may be added to an electrostatic ink composition in order to impart and/or maintain sufficient electrostatic charge on the ink particles. In some examples, the charge director may comprise ionic compounds, particularly metal salts of fatty acids, metal salts of sulfo-succinates, metal salts of oxyphosphates, metal salts of alkyl-benzenesulfonic acid, metal salts of aromatic carboxylic acids or sulfonic acids, as well as zwitterionic and non-ionic compounds, such as polyoxyethylated alkylamines, lecithin, polyvinylpyrrolidone, organic acid esters of polyvalent alcohols, etc. The charge director can be selected from, but is not limited to, oil-soluble petroleum sulfonates (e.g. neutral Calcium Petronate™, neutral Barium Petronate™, and basic Barium Petronate™), polybutylene succinimides (e.g. OLOA™, 1200 and Amoco 575), and glyceride salts (e.g. sodium salts of phosphated mono- and diglycerides with unsaturated and saturated acid substituents), sulfonic acid salts including, but not limited to, barium, sodium, calcium, and aluminum salts of sulfonic acid. The sulfonic acids may include, but are not limited to, alkyl sulfonic acids, aryl sulfonic acids, and sulfonic acids of alkyl succinates. The charge director can impart a negative charge or a positive charge on the resin-containing particles of an electrostatic ink composition.

The charge director may be added in order to impart and/or maintain sufficient electrostatic charge on the ink particles, which may be particles comprising the thermoplastic resin.

In some examples, the electrostatic ink composition comprises a charge director comprising a simple salt. The ions constructing the simple salts are all hydrophilic. The simple salt may include a cation selected from the group consisting of Mg, Ca, Ba, $NH_4$, tert-butyl ammonium, $Li^+$, and $Al^{+3}$, or from any sub-group thereof. The simple salt may include an anion selected from the group consisting of $SO_4^{2-}$, $PO^{3-}$, $NO^{3-}$, $HPO_4^{2-}$, $CO_3^{2-}$, acetate, trifluoroacetate (TFA), $Cl^-$, $BF_4^-$, $F^-$, $ClO_4^-$, and $TiO_3^{4-}$ or from any sub-group thereof. The simple salt may be selected from $CaCO_3$, $Ba_2TiO_3$, $Al_2(SO_4)$, $Al(NO_3)_3$, $Ca_3(PO_4)_2$, $BaSO_4$, $BaHPO_4$, $Ba_2(PO_4)_3$, $CaSO_4$, $(NH_4)_2CO_3$, $(NH_4)_2SO_4$, $NH_4OAc$, Tert-butyl ammonium bromide, $NH_4NO_3$, LiTFA, $Al_2(SO_4)_3$, $LiClO_4$ and $LiBF_4$, or any sub-group thereof.

In some examples, the electrostatic ink composition comprises a charge director comprising a sulfosuccinate salt of the general formula MAn, wherein M is a metal, n is the valence of M, and A is an ion of the general formula (I): $[R^1-O-C(O)CH_2CH(SO_3^-)C(O)-O-R^2]$, wherein each of $R^1$ and $R^2$ is an alkyl group. In some examples each of $R_1$ and $R_2$ is an aliphatic alkyl group. In some examples, each of $R_1$ and $R_2$ independently is a C6-25 alkyl. In some examples, said aliphatic alkyl group is linear. In some examples, said aliphatic alkyl group is branched. In some examples, said aliphatic alkyl group includes a linear chain of more than 6 carbon atoms. In some examples, $R_1$ and $R_2$ are the same. In some examples, at least one of $R_1$ and $R_2$ is $C_{13}H_{27}$. In some examples, M is Na, K, Cs, Ca, or Ba.

In some examples, the charge director comprises at least one micelle forming salt and nanoparticles of a simple salt as described above. The simple salts are salts that do not form micelles by themselves, although they may form a core for micelles with a micelle forming salt. The sulfosuccinate salt of the general formula MAn is an example of a micelle forming salt. The charge director may be substantially free of an acid of the general formula HA, where A is as described above. The charge director may include micelles of said sulfosuccinate salt enclosing at least some of the nanoparticles of the simple salt. The charge director may include at least some nanoparticles of the simple salt having a size of 200 nm or less, and/or in some examples 2 nm or more.

The charge director may include one of, some of or all of (i) soya lecithin, (ii) a barium sulfonate salt, such as basic barium petronate (BPP), and (iii) an isopropyl amine sulfonate salt. Basic barium petronate is a barium sulfonate salt of a 21-26 hydrocarbon alkyl, and can be obtained, for example, from Chemtura. An example isopropyl amine sulphonate salt is dodecyl benzene sulfonic acid isopropyl amine, which is available from Croda.

In some examples, the charge director constitutes about 0.001% to 20%, in some examples 0.01% to 20% by weight, in some examples 0.01 to 10% by weight, in some examples 0.01% to 1% by weight of the solids of an electrostatic ink composition. In some examples, the charge director constitutes about 0.001% to 0.15% by weight of the solids of the electrostatic ink composition, in some examples 0.001% to 0.15%, in some examples 0.001% to 0.02% by weight of the solids of an electrostatic ink composition, in some examples 0.1% to 2% by weight of the solids of the electrostatic ink composition, in some examples 0.2% to 1.5% by weight of the solids of the electrostatic ink composition in some examples 0.1% to 1% by weight of the solids of the electrostatic ink composition, in some examples 0.2% to 0.8% by weight of the solids of the electrostatic ink composition.

In some examples, the charge director is present in an amount of from 3 mg/g to 20 mg/g, in some examples from 3 mg/g to 15 mg/g, in some examples from 10 mg/g to 15 mg/g, in some examples from 5 mg/g to 10 mg/g (where mg/g indicates mg per gram of solids of the electrostatic ink composition).

Other Additives

The electrostatic ink composition may include another additive or a plurality of other additives. The other additive or plurality of other additives may be added at any stage of the method. The other additive or plurality of other additives may be selected from a charge adjuvant, a wax, a surfactant, viscosity modifiers, and compatibility additives. The wax may be an incompatible wax. As used herein, "incompatible wax" may refer to a wax that is incompatible with the resin. Specifically, the wax phase separates from the resin phase upon the cooling of the resin fused mixture on a print substrate during and after the transfer of the ink film to the print substrate, e.g. from an intermediate transfer member, which may be a heated blanket.

In some examples, the electrostatic ink composition includes a charge adjuvant. A charge adjuvant may promote charging of the particles when a charge director is present. The method as described herein may involve adding a charge adjuvant at any stage. The charge adjuvant can include, for example, barium petronate, calcium petronate, Co salts of naphthenic acid, Ca salts of naphthenic acid, Cu salts of naphthenic acid, Mn salts of naphthenic acid, Ni salts of naphthenic acid, Zn salts of naphthenic acid, Fe salts of naphthenic acid, Ba salts of stearic acid, Co salts of stearic acid, Pb salts of stearic acid, Zn salts of stearic acid, Al salts of stearic acid, Zn salts of stearic acid, Cu salts of stearic acid, Pb salts of stearic acid, Fe salts of stearic acid, metal carboxylates (e.g., Al tristearate, Al octanoate, Li heptanoate, Fe stearate, Fe distearate, Ba stearate, Cr stearate, Mg octanoate, Ca stearate, Fe naphthenate, Zn naphthenate, Mn heptanoate, Zn heptanoate, Ba octanoate, Al octanoate, Co octanoate, Mn octanoate, and Zn octanoate), Co lineolates, Mn lineolates, Pb lineolates, Zn lineolates, Ca oleates, Co oleates, Zn palmirate, Ca resinates, Co resinates, Mn resinates, Pb resinates, Zn resinates, AB diblock copolymers of 2-ethylhexyl methacrylate-co-methacrylic acid calcium and ammonium salts, copolymers of an alkyl acrylamidoglycolate alkyl ether (e.g., methyl acrylamidoglycolate methyl ether-co-vinyl acetate), and hydroxy bis(3,5-di-tert-butyl salicylic) aluminate monohydrate. In an example, the charge adjuvant is or includes aluminum di- or tristearate. In some examples, the charge adjuvant is VCA (an aluminium tristearate and palmitate salt, available from Sigma Aldrich).

The charge adjuvant may be present in an amount of about 0.1 to 5% by weight, in some examples about 0.1 to 1% by weight, in some examples about 0.3 to 0.8% by weight of the solids of the electrostatic ink composition, in some examples about 1 wt % to 3 wt % of the solids of the electrostatic ink composition, in some examples about 1.5 wt % to 2.5 wt % of the solids of the electrostatic ink composition.

The charge adjuvant may be present in an amount of less than 5.0% by weight of total solids of the electrostatic ink composition, in some examples in an amount of less than 4.5% by weight, in some examples in an amount of less than 4.0% by weight, in some examples in an amount of less than 3.5% by weight, in some examples in an amount of less than 3.0% by weight, in some examples in an amount of less than 2.5% by weight, in some examples about 2.0% or less by weight of the solids of the electrostatic ink composition.

In some examples, the electrostatic ink composition further includes, e.g. as a charge adjuvant, a salt of multivalent cation and a fatty acid anion. The salt of multivalent cation and a fatty acid anion can act as a charge adjuvant. The multivalent cation may, in some examples, be a divalent or a trivalent cation. In some examples, the multivalent cation is selected from Group 2, transition metals and Group 3 and Group 4 in the Periodic Table. In some examples, the multivalent cation includes a metal selected from Ca, Sc, Ti, V, Cr, Mn, Fe, Co, Ni, Cu, Zn, Al and Pb. In some examples, the multivalent cation is $Al^{3+}$. The fatty acid anion may be selected from a saturated or unsaturated fatty acid anion. The fatty acid anion may be selected from a $C_8$ to $C_{26}$ fatty acid anion, in some examples a $C_{14}$ to $C_{22}$ fatty acid anion, in some examples a $C_{16}$ to $C_{20}$ fatty acid anion, in some examples a $C_{17}$, $C_{18}$ or $C_{19}$ fatty acid anion. In some examples, the fatty acid anion is selected from a caprylic acid anion, capric acid anion, lauric acid anion, myristic acid anion, palmitic acid anion, stearic acid anion, arachidic acid anion, behenic acid anion and cerotic acid anion.

The charge adjuvant, which may, for example, be or include a salt of a multivalent cation and a fatty acid anion, may be present in an amount of 0.1 wt % to 5 wt % of the solids of the electrostatic ink composition, in some examples in an amount of 0.1 wt % to 2 wt % of the solids of the electrostatic ink composition, in some examples in an amount of 0.1 wt % to 2 wt % of the solids of the electrostatic ink composition, in some examples in an amount of 0.3 wt % to 1.5 wt % of the solids of the electrostatic ink composition, in some examples about 0.5 wt % to 1.2 wt % of the solids of the electrostatic ink composition, in some examples about 0.8 wt % to 1 wt % of the solids of the electrostatic ink composition, in some examples about 1 wt % to 3 wt % of the solids of the electrostatic ink composition, in some examples about 1.5 wt % to 2.5 wt % of the solids of the electrostatic ink composition.

Method for Producing an Electrostatic Ink Composition

Also provided us a method of forming an electrostatic ink composition, e.g. a gold electrostatic ink composition. The method may comprise:

providing a pigment comprising mica coated with titanium dioxide and an additional metal oxide; and, combining the pigment, a resin and a carrier liquid to form an electrostatic ink composition.

In some examples the method of forming an electrostatic ink composition comprises combining a resin and a pigment to form ink particles and dispersing the ink particles in a carrier liquid to form an electrostatic ink composition.

In some examples, forming the ink particles comprises grinding the resin and pigment in the presence of a carrier liquid. In some examples, the resin and pigment are ground in the present of a carrier liquid and a charge adjuvant such as VCA. In some examples, additional carrier liquid may then be added to the composition. In some examples, the method comprises adding a charge director to the composition comprising ink particles dispersed in a carrier liquid.

Printing Process and Print Substrate

Also provided is a method of electrostatic printing, the method including:

providing a liquid electrostatic ink composition as described herein, contacting the electrostatic ink composition with a latent electrostatic image on a surface to create a developed image, transferring the developed image to a print substrate, in some examples via an intermediate transfer member.

In some examples, the surface on which the (latent) electrostatic image is formed or developed may be on a rotating member, e.g. in the form of a cylinder. The surface on which the (latent) electrostatic image is formed or developed may form part of a photo imaging plate (PIP). The method may involve passing the electrostatic ink composition between a stationary electrode and a rotating member, which may be a member having the surface having the (latent) electrostatic image thereon or a member in contact with the surface having the (latent) electrostatic image thereon. A voltage is applied between the stationary electrode and the rotating member, such that particles adhere to the surface of the rotating member. The intermediate transfer member, if present, may be a rotating flexible member, which may be heated, e.g. to a temperature of from 80 to 160° C.

The present disclosure also provides an electrostatic ink composition producible according to the method described herein. There may also be provided a print substrate having printed thereon an electrostatic ink composition as described herein and/or producible according to the method described herein.

The print substrate may be any suitable substrate. The substrate may be any suitable substrate capable of having an image printed thereon. The substrate may include a material selected from an organic or inorganic material. The material may include a natural polymeric material, e.g. cellulose. The material may include a synthetic polymeric material, e.g. a polymer formed from alkylene monomers, including, for example, polyethylene and polypropylene, and co-polymers such as styrene-polybutadiene. The polypropylene may, in some examples, be biaxially orientated polypropylene. The material may include a metal, which may be in sheet form. The metal may be selected from or made from, for instance, aluminium (Al), silver (Ag), tin (Sn), copper (Cu), mixtures thereof. In an example, the substrate includes a cellulosic paper. In an example, the cellulosic paper is coated with a polymeric material, e.g. a polymer formed from styrene-butadiene resin. In some examples, the cellulosic paper has an inorganic material bound to its surface (before printing with ink) with a polymeric material, wherein the inorganic material may be selected from, for example, kaolinite or calcium carbonate. The substrate is, in some examples, a cellulosic print substrate such as paper. The cellulosic print substrate is, in some examples, a coated cellulosic print. In some examples, a primer may be coated onto the print substrate, before the electrostatic ink composition is printed onto the print substrate.

FIG. 1 shows a schematic illustration of a Liquid Electro Photographic (LEP) printing apparatus which may be used to print an electrostatic ink composition as described herein. An image, including any combination of graphics, text and images, may be communicated to the LEP printing apparatus 1. According to an illustrative example, in order to print the electrostatic ink composition, firstly, the photo charging unit 2 deposits a uniform static charge on the photo-imaging cylinder 4 and then a laser imaging portion 3 of the photo charging unit 2 dissipates the static charges in selected portions of the image area on the photo-imaging cylinder 4 to leave a latent electrostatic image. The latent electrostatic image is an electrostatic charge pattern representing the image to be printed. The electrostatic ink composition is then transferred to the photo-imaging cylinder 4 by Binary Ink Developer (BID) unit 6. The BID unit 6 present a uniform film of the electrostatic ink composition to the photo-imaging cylinder 4. A resin component of the electrostatic ink composition may be electrically charged by virtue of an appropriate potential applied to the electrostatic ink composition in the BID unit. The charged resin component which, by virtue of an appropriate potential on the electrostatic image areas, is attracted to the latent electrostatic image on the photo-imaging cylinder 4 (first transfer). The electrostatic ink composition does not adhere to the uncharged, non-image areas and forms an image on the surface of the latent electrostatic image. The photo-imaging cylinder 4 then has a developed electrostatic ink composition image on its surface.

The image is then transferred from the photo-imaging cylinder 4 to the intermediate transfer member (ITM) 8 by virtue of an appropriate potential applied between the photo-imaging cylinder 4 and the ITM 8, such that the charged electrostatic ink composition is attracted to the ITM 8 (second transfer). The image is then dried and fused on the ITM 8 before being transferred to a print substrate 10.

Between the first and second transfers the solid content of the electrostatic ink composition image is increased and the electrostatic ink composition is fused on to the ITM 8. For example, the solid content of the electrostatic ink composition image deposited on the ITM 8 after the first transfer is typically around 20%, by the second transfer the solid content of the image is typically around 80-90%. This drying and fusing is typically achieved by using elevated temperatures and air flow assisted drying. In some examples, the ITM 8 is heatable.

EXAMPLES

The following illustrates examples of the compositions and related aspects described herein. Thus, these examples should not be considered to restrict the present disclosure, but are merely in place to teach how to make examples of compositions of the present disclosure.

Example 1

Preparation of Gold Electrostatic Ink Composition

Materials
Nucrel® 699 from Dupont—copolymer of ethylene and methacrylic acid, made with nominally 11 wt % methacrylic acid.
Honeywell AC-5120-Ethylene-Acrylic Acid Copolymer with acid number of 112-130 KOH/g.
Isopar L—an iso-paraffinic oil manufactured by EXXON.
VCA—an aluminium tristearate and palmitate salt, available from Sigma Aldrich.
Gold pigment—IRIDESIUM—3325 (gold), available from Jiang Su Pritty Pearlescent Pigments Co., Ltd (composition: 28-38 wt. % mica, 55-65 wt. % titanium dioxide, 12-16 wt. % iron oxide, less than 1 wt. % tin dioxide; particle size range 5-25 μm).
Charge director: NCD—a natural charge director having the components (i) natural soya lecithin, (ii) basic barium petronate, and (iii) dodecyl benzene sulphonic acid, amine salt, with the components (i), (ii) and (iii) being present in the weight ratios of 6.6%:9.8:3.6%.

A paste was formed by mixing the resins Nucrel® 699 and AC-5120 (4:1 ratio by weight) at 31 wt. % NVS in the presence of a carrier liquid (Isopar L) in a double-planetary mixer device (Ross mixer—Model DPM-2, obtained from Charles Ross & Son Company—Hauppauge, N.Y.) at 120° C. to 160° C. and 70 rpm for 3 hours. After 3 hours, the heating was stopped and mixing continued until the ingredients reached room temperature.

The paste was then added to a 1 liter ceramic-lined tank of 0-S Attritor batch grinding mill available from Union Process Co. (Akron, Ohio) with Gold pigment, charge adjuvant (VCA) in the amounts shown in table 1 below. Isopar L was added to give 20 wt. % NVS in the grinding mill. Grinding was carried out at 40° C., 250 rpm and the overall material in the attritor was 230 g.

TABLE 1

| Materials | wt. % by total solids |
|---|---|
| Resins Nucrel ®699 and AC-5120 mixture (4:1) | 58 |
| Gold pigment | 40 |
| VCA | 2 |

A 3 wt. % NVS working dispersion was prepared from the ground material by adding Isopar L to dilute the ground material. A charge direction (NCD) was added to the 3 wt. % NVS working dispersion at 5.5 mg/1 g Isopar to produce a liquid electrophotographic (LEP) ink composition.

The LEP ink composition was printed onto paper print substrate using an Indigo 5000 series press to produce a gold printed image.

Example 2

A gold LEP ink composition was prepared as for Example 1 except that the resin used was Nucrel® 599 from Dupont (copolymer of ethylene and methacrylic acid, made with nominally 10 wt % methacrylic acid) in place of the Nucrel® 699 and AC-5120 resins used in Example 1.

The LEP ink composition was printed onto paper print substrate using an Indigo 5000 series press to produce a gold printed image.

The present inventors have also produced similar LEP ink compositions to those described in Examples 1 and 2 above using the pigment Iriodin® 302 (available from Merck, pigment composition: 43 wt. % mica, 46 wt. % titanium dioxide, 9 wt. % iron oxide, 2 wt. % zirconium dioxide) instead of Iridesium 3325. These additional LEP ink compositions were also printed using an Indigo 5000 series printing press to produce gold printed images.

The present inventors have found that the electrostatic ink compositions described herein can be used to provide images having a realistic gold colour.

The present inventors have also found that the ratio of the titanium dioxide to iron oxide used in the pigment may affect the colour of images produced by the electrostatic ink composition.

For example, the pigment used in the Examples described above has been found to provide electrostatic ink compositions which provide images having a realistic gold colour.

While the electrostatic ink compositions, methods and related aspects have been described with reference to certain examples, it will be appreciated that various modifications, changes, omissions, and substitutions can be made without departing from the spirit of the disclosure. It is intended, therefore, that the electrostatic ink compositions, methods and related aspects be limited only by the scope of the following claims. Unless otherwise stated, the features of any dependent claim can be combined with the features of any of the other dependent claims, and any other independent claim.

The invention claimed is:

1. A liquid electrostatic ink composition, comprising:
   a pigment comprising mica coated with titanium dioxide and an additional metal oxide;
   a resin;
   a charge director; and
   a carrier liquid selected from the group consisting of an isoparaffinic compound, a paraffinic compound, and a combination thereof.

2. The composition according to claim 1, wherein the additional metal oxide comprises iron oxide.

3. The composition according to claim 1, wherein the additional metal oxide comprises iron oxide and tin dioxide.

4. The composition according to claim 1, wherein the additional metal oxide comprises iron oxide in combination with tin dioxide and/or zirconium dioxide.

5. The composition according to claim 1, wherein the additional metal oxide comprises iron oxide and the ratio of titanium dioxide to iron oxide is from about 1:1 to about 10:1 by weight.

6. The composition according to claim 1, comprising ink particles comprising the resin and the pigment.

7. The composition according to claim 1, wherein the pigment comprises pigment particles comprising mica coated with titanium dioxide and an additional metal oxide, the pigment particles having a longest dimension which is less than about 25 µm.

8. The composition according to claim 1, wherein the resin comprises a polymer having acidic side groups.

9. The composition according to claim 1, wherein the resin comprises a copolymer of an alkylene monomer and a monomer selected from acrylic acid and methacrylic acid.

10. The composition according to claim 1, wherein the pigment comprises:
    20 to 55 wt.% mica;
    20 to 70 wt.% titanium dioxide; and
    5 to 40 wt.% iron oxide.

11. The composition according to claim 1, wherein the pigment comprises:
    20 to 55 wt.% mica;
    20 to 70 wt.% titanium dioxide;
    5 to 40 wt.% iron oxide; and
    tin dioxide in an amount up to 2 wt.%.

12. A method for producing an electrostatic ink composition, the method comprising:
    providing a pigment comprising mica coated with titanium dioxide and an additional metal oxide; and
    combining the pigment, a resin, a charge director, and a carrier liquid to form an electrostatic ink composition, wherein the carrier liquid is selected from the group consisting of an isoparaffinic compound, a paraffinic compound, and a combination thereof.

13. The method according to claim 12 comprising combining the resin and the pigment to form ink particles and dispersing the ink particles in a carrier liquid to form an electrostatic ink composition.

14. The method according to claim 13 comprising grinding the resin and the pigment in the presence of the carrier liquid to form ink particles.

15. A method of electrostatic printing, comprising:
    providing a liquid electrostatic ink composition comprising:
      a pigment comprising mica coated with titanium dioxide and an additional metal oxide;
      a resin;
      a charge director; and
      a carrier liquid selected from the group consisting of an isoparaffinic compound, a paraffinic compound, and a combination thereof;
    contacting the liquid electrostatic ink composition with a latent electrostatic image on a surface to create a developed image; and
    transferring the developed image to a print substrate.

* * * * *